United States Patent
Herrmann et al.

(10) Patent No.: US 10,788,370 B2
(45) Date of Patent: Sep. 29, 2020

(54) THERMAL INFRARED SENSOR ARRAY IN WAFER-LEVEL PACKAGE

(71) Applicant: HEIMANN SENSOR GMBH, Dresden (DE)

(72) Inventors: Frank Herrmann, Dohna (DE); Christian Schmidt, Dresden (DE); Jörg Schieferdecker, Dresden (DE); Wilhelm Leneke, Taunusstein (DE); Bodo Forg, Mainz (DE); Marion Simon, Bad Schwalbach (DE); Michael Schnorr, Niedernhausen (DE)

(73) Assignee: HEIMANN SENSOR GMBH, Dresden (DE)

( * ) Notice: Subject to any disclaimer, the term of this patent is extended or adjusted under 35 U.S.C. 154(b) by 127 days.

(21) Appl. No.: 15/777,742

(22) PCT Filed: Nov. 28, 2016

(86) PCT No.: PCT/EP2016/078943
§ 371 (c)(1),
(2) Date: May 21, 2018

(87) PCT Pub. No.: WO2017/089604
PCT Pub. Date: Jun. 1, 2017

(65) Prior Publication Data
US 2018/0335347 A1   Nov. 22, 2018

(30) Foreign Application Priority Data

Nov. 27, 2015 (DE) .......................... 10 2015 120 685
Nov. 30, 2015 (DE) .......................... 10 2015 120 737

(51) Int. Cl.
*G01J 5/20*       (2006.01)
*G01J 5/02*       (2006.01)
(Continued)

(52) U.S. Cl.
CPC ............... *G01J 5/0225* (2013.01); *G01J 5/02* (2013.01); *G01J 5/0285* (2013.01); *G01J 5/045* (2013.01);
(Continued)

(58) Field of Classification Search
CPC .......... G01J 5/0225; G01J 5/02; G01J 5/0285; G01J 5/12; G01J 5/046; G01J 5/045; G01J 2005/106; G01J 2005/123
See application file for complete search history.

(56) References Cited

U.S. PATENT DOCUMENTS 5,323,051 A    6/1994  Adams et al.
6,504,153 B1*  1/2003  Shigenaka ........ H01L 27/14649
                                                    250/338.4
(Continued)

FOREIGN PATENT DOCUMENTS

CN    104246457 A    12/2014
CN    103148947 B    3/2016
(Continued)

OTHER PUBLICATIONS

International Search Report issued in PCT/EP2016/078943 dated Feb. 24, 2017.
(Continued)

*Primary Examiner* — Kiho Kim
(74) *Attorney, Agent, or Firm* — Heslin Rothenberg Farley and Mesiti PC; Nicholas Mesiti

(57) ABSTRACT

A thermal infrared sensor array in a wafer-level package includes at least one infrared-sensitive pixel produced using silicon micro mechanics, comprising a heat-isolating cavity in a silicon substrate surrounded by a silicon edge, and a thin membrane connected to the silicone edge by of thin beams. The cavity extends through the silicon substrate to the membrane, and there are slots between the membrane, the
(Continued)

beams and the silicon edge. A plurality of infrared-sensitive individual pixels are arranged in lines or arrays and are designed in a CMOS stack in a dielectric layer, forming the membrane, and are arranged between at least one cover wafer which is designed in the form of a cap and has a cavity and a base wafer. The cover wafer, the silicon substrate and the base wafer are connected to one another in a vacuum-tight manner and enclosing a gas vacuum.

15 Claims, 4 Drawing Sheets

(51) Int. Cl.
  *G01J 5/04* (2006.01)
  *G01J 5/12* (2006.01)
  *G01J 5/10* (2006.01)

(52) U.S. Cl.
  CPC ............... *G01J 5/046* (2013.01); *G01J 5/12* (2013.01); *G01J 2005/106* (2013.01); *G01J 2005/123* (2013.01)

(56) References Cited

U.S. PATENT DOCUMENTS

| | | | |
|---|---|---|---|
| 7,005,643 B2* | 2/2006 | Hamamoto | B81C 3/001 250/338.1 |
| 7,180,064 B2 | 2/2007 | Lee et al. | |
| 8,519,336 B2 | 8/2013 | Ohhira et al. | |
| 2005/0081905 A1 | 4/2005 | Lan et al. | |
| 2005/0224714 A1 | 10/2005 | Akin et al. | |
| 2006/0016995 A1 | 1/2006 | Kummer et al. | |
| 2007/0170359 A1* | 7/2007 | Syllaios | G01J 3/02 250/338.1 |
| 2008/0128620 A1 | 6/2008 | Krellner et al. | |
| 2009/0301542 A1* | 12/2009 | Ojima | G01J 5/04 136/242 |
| 2012/0319303 A1 | 12/2012 | Foster et al. | |
| 2014/0061845 A1 | 3/2014 | Purkl et al. | |
| 2015/0001659 A1* | 1/2015 | Le Neel | H01L 27/14629 257/432 |
| 2017/0074725 A1* | 3/2017 | Roeher et al. | G01J 5/02 250/338.1 |

FOREIGN PATENT DOCUMENTS

| | | |
|---|---|---|
| DE | 102004020685 B3 | 9/2005 |
| DE | 102008002157 A1 | 12/2009 |
| EP | 2172753 A1 | 4/2010 |
| EP | 2172755 A1 | 4/2010 |
| EP | 2172755 A1 | 7/2010 |
| JP | 05283757 | 10/1993 |
| JP | 08035879 A | 2/1996 |
| JP | 2000298063 A | 10/2000 |
| JP | 2008084987 B2 | 4/2008 |
| JP | 2008139315 A | 6/2008 |
| JP | 2010507082 A | 3/2010 |
| JP | 2011137744 A | 7/2011 |
| JP | 2011145296 A | 7/2011 |
| JP | 2012215531 A | 11/2012 |
| JP | 2015507206 A | 3/2015 |
| JP | 2015175768 A | 10/2015 |
| KR | 1020100040408 | 4/2010 |
| KR | 1020140136450 | 11/2014 |
| WO | 2013120652 A1 | 8/2013 |
| WO | 2014180635 A1 | 11/2014 |

OTHER PUBLICATIONS

M. Arndt et al., "Spectroscopic carbon dioxide sensor for automotive applications," Proc. IEEE Sensors 2004, vol. 1, pp. 252-255.
A. Roncaglia et al., "CMOS-compatible fabrication of thermopiles with high sensitivity in the 3-5Um atmospheric window," Sensors and Actuators B: Chemical, Elsevier, BV, NL, vol. 125, No. 1, Jul. 2007, pp. 214-223.

* cited by examiner

THERMAL INFRARED SENSOR ARRAY IN WAFER-LEVEL PACKAGE

CROSS REFERENCE TO RELATED APPLICATIONS

This application is the National Phase filing under 35 U.S.C. § 371 of International Application No.: PCT/EP2016/078943, filed on Nov. 28, 2016, and published on Jun. 1, 2017 as WO 2017/089604 A1, and claims priority to German Application No.: 10 2015 120 737.0, filed on Nov. 30, 2015, and to German Application No.: 10 2015 120 685.4, filed on Nov. 27, 2015. The contents of each of the prior applications are hereby incorporated by reference herein in their entirety.

BACKGROUND ART

The invention relates to a thermal infrared sensor array in wafer-level package comprising at least one infrared-sensitive pixel produced using silicon micromachining, comprising a thermally insulating pit in a silicon substrate, said pit being surrounded by a silicon edge, and comprising a thin membrane connected to the silicon edge by means of thin beams, wherein slots are situated between the membrane, the beams and the silicon edge.

Infrared thermopile sensors and arrays are sufficiently known in various forms and designs. Thermopile sensors produced using silicon micromachining on a substrate normally consist of a thin membrane, on which thermocouples produced using thin-film technology are situated. Situated below the membrane there is a hollow in the substrate, said hollow being surrounded by a silicon edge (carrying body). Thermocouples in the form of elongated thermopile elements have "hot" contacts at one end and "cold" contacts at the other end, which are connected to one another by conductive tracks, wherein the "hot" contacts are situated on or in the central part of the membrane and the "cold" contacts are situated on the silicon edge, which serves as a heat sink.

Situated between the silicon edge and the membrane there are long narrow beams (webs) which connect the central part of the membrane (absorber region) to the heat sink (silicon edge of the respective pixel) and which comprise one or more thermocouples, wherein the conductive tracks of the thermopile elements extend on the beams. Situated on both sides of the long beams there are slots which separate the beams from the central part and the silicon edge of a pixel, i.e. the heat sink.

The majority of the absorption of infrared radiation takes place in the central region of the membrane. Particularly in the case of arrays having high spatial resolution, the pixels are small and the slots are very narrow. In order to increase the filling level of the sensor, an infrared screen can be clamped above the membrane or the pixel, as is evident from WO2013/120652 A1, in order to be able to take up more infrared radiation as a result of the larger area. Filling level should be understood to mean the ratio of the size of the absorbing area to the size of the pixel itself.

The thermocouples on the beams are situated relatively near the heat sink (silicon edge), such that a larger portion of heat can flow away to the heat sink via the gas situated therebetween. This results in a signal loss. In order to counteract that, a vacuum sealing of the thermopile infrared array sensors is usually striven for.

So-called encapsulated thermopile sensors produced using surface micromachining, for example, are known in the literature, as is evident from Arndt, M. and Sauer, M. "Spectroscopic carbon dioxide sensor for automotive applications", Proc. IEEE Sensors 2004, Vienna, 2004, vol. 1, 252-255. In this case, the slots in the membrane are used for producing a cavity underneath. The cavity is produced by anisotropic etching through the slots, wherein protection of the surrounding electronics is necessary in order to achieve the effect that only the silicon below the membrane is etched by the etching liquid. A further wafer bonded onto this arrangement is required for producing a hermetically sealed encapsulation. Without the encapsulation, the heat would be emitted again to the air and also to the lateral silicon walls surrounding the cavity. By virtue of the encapsulation, said heat can no longer escape via the gas.

U.S. Pat. No. 8,519,336 B2 proposes a configuration in which an infrared receiver is situated above a reflective layer. An evaluation circuit is situated on a circuit lying underneath. This involves a system in which three silicon substrate (wafers) are combined. The required receiving unit consists of a thermopile above a pressure-reduced and sealed pit situated in direct proximity to the receiving unit.

Furthermore, a reflective layer composed of a reflective material, such as e.g. gold or aluminum, is situated below the receiving unit, such that infrared radiation which was not primarily detected in the receiving unit is reflected and focused back again onto the receiving unit and is available for the renewed possibility of detection.

It goes without saying that the detection unit has to be electrically connected to the evaluation circuit, which can be achieved for example by means of plated-through holes (through silicon vias). However, this variant requires a high alignment accuracy since the wafers have to be aligned very accurately with one another in order actually to be able to produce the electrical connections.

CN 103148947 A describes a wafer-level packaging structure which increases the response rate of a thermopile detector. To that end, the thermopile structure is situated on an inverted silicon wafer that is applied on a PCT (Printed Circuit Board) by means of flip-chip technology. The hot contacts of the thermopile structure are situated on a membrane and are connected to cold contacts via thermocouples. An IR-reflecting layer is situated on the PCB in order to reflect parts of the transmitted infrared radiation partly back again onto the membrane and in order to be able to detect this part of the IR radiation again.

In this arrangement, the silicon of the silicon wafer itself is used as a lens. Such a design appears to be suitable principally for temperature measurements in relative proximity to the sensor (thermopile structure) because distant objects can be detected only with difficulty owing to the short focal length of the lens.

Furthermore, US 2008/0128620 describes a system comprising three bonded wafers, wherein a plurality of thermopiles are situated on a thinned wafer between the other two wafers, and the upper and lower wafers are each provided with a pit surrounding the thermopiles. In this arrangement, in the lower wafer a silicon base is provided by etching a pit into the wafer for the thermopile. The second, middle wafer is thinned to an extent such that only a thin membrane is left. The thermopile with connected electronics is constructed on said thin membrane. A cap composed of semiconducting material—that is the upper wafer—is bonded onto the thin membrane after the membrane has been bonded onto the silicon base.

The disadvantage of such an arrangement can be seen in the fact that the thermopile is evidently applied subsequently on the thinned wafer, which is very complex.

The thermopile is applied here on the membrane without slots or open channels between the two pits. Furthermore, a vacuum is necessary around the thermopile in order to prevent heat transfer by a gas. Producing the vacuum additionally necessitates a getter material in both pits, which is very expensive.

The compatibility of this production process with the CMOS process is limited for the signal processing and requires complex production methods.

EP 2 172 755 A1 relates to an infrared sensor comprising a bandpass filter on the front side and a vacuum cavity. In the vacuum cavity, a temperature sensor is situated at a predefined distance above the sensor. The latter simultaneously constitutes the top side of the cavity.

Furthermore, EP 2 172 755 A1 describes a solution with a wafer whose opening having oblique walls below the sensor passes through the complete substrate wafer. In order to hermetically close said opening, a type of base wafer is used. This solution of hermetic sealing by drive-in or wet-chemical etching of oblique pits is sufficient for single-element sensors, but for thermopile sensor arrays having many individual sensors/pixels that would lead to very large sensor or focal plane array (FPA) regions, which greatly increases the costs of the chip itself but also of the associated optics. The necessary offset between the mask on the rear side of the wafer and the membrane on the front side obstructs a miniaturized arrangement of many pixels. Small pixels where d<400 μm are therefore not producible.

As a result of the sensor or FPA region then becoming larger, the miniaturization striven for would be possible only by way of a reduction of the number of pixels and hence a vitiated optical imaging.

In U.S. Pat. No. 7,180,064 B2, an infrared sensor package is used to protect the membrane against external influences. The thermopile chip here has no perforations in the membrane through which the heat transfer via the membrane from the hot contacts toward the silicon sink can be reduced. Furthermore, there are no indications concerning a vacuum closure of the sensor arrangement, and although this enables production under standard atmosphere with significantly lower outlay, on the other hand it prevents a sufficiently high signal resolution in the case of small pixels. The connection between the silicon elements need not necessarily lead to a hermetically sealed package, or getter media would have to be applied independently of one another in the upper and lower pits, which would increase the costs.

US 2012/0319303 A1 relates to a hermetic seal for micromechanical systems comprising a metal alloy with confinement of a gas having a high relative permittivity.

Furthermore, U.S. Pat. No. 5,323,051 describes a semiconductor wafer-level package, wherein an encapsulation wafer is applied on the actual wafer having structures before the wafer is diced into individual chips.

US 2006/0016995 A1 describes a microstructured infrared sensor in a package comprising a cap, which is referred to as cap chip and which contains an integrated lens surface for focusing. However, such a solution is suitable only for relatively large pixels of single-element sensors.

US 2005/0081905 A1 discloses a thermopile infrared package comprising a membrane above a pit, wherein a cap is likewise applied to the substrate for sealing purposes. It is not necessary to seal the pit below the membrane, but heat transfer is possible below the membrane through a gas situated there and the actual effect of the sealing of the pit above the membrane is lost.

Finally, DE 10 2004 020 685 B3 describes an infrared sensor comprising a getter layer, wherein a pit is situated directly below a perforated membrane region. This arrangement is covered with a cover wafer.

To summarize it can be stated that none of said documents describes a high-resolution infrared sensor array comprising small pixels which is producible in a CMOS-compatible process, allows simple placement of reflective layers on a cavity below a sensor pixel and which can be hermetically sealed by applying an individual getter medium.

BRIEF SUMMARY OF THE INVENTION

The object of the invention consists, therefore, in specifying a highly sensitive thermopile infrared array sensor in a wafer-level package comprising small pixels with a simple CMOS-compatible process technology for a sensor wafer itself and a vacuum-tight closure at the wafer level, with which it is furthermore possible for the getter medium that is usually used for the vacuum-tight closure to be applied spatially separately from the filter layers of a cover wafer.

The sensitivity of an infrared sensor is also dependent, in particular, on the heat dissipation via the gas which surrounds the infrared sensor, and can be increased by means of a vacuum-tight packing. Signal losses as a result of heat conduction via the gas are not present in a vacuum-tight housing. However, conventional vacuum housings in construction and connection technology involve a high outlay in terms of material and costs in order to achieve the necessary vacuum-tightness. Even normal chip adhesive bonding can become a cost and problem factor on account of outgassings and leakage.

By contrast, packaging and vacuum-tight sealing at the wafer level can be realized cost-effectively and in a manner suitable for mass production. The necessary vacuum-tightness is achieved by the encapsulation of the thermopile sensor wafer with a cover wafer and an underside base wafer.

The invention relates to a thermal infrared sensor chip comprising at least one small sensitive thermopile element (pixel) which is produced using silicon micromachining and in which a thermally insulating pit (cavity) is formed below a thin membrane not by etching out a sacrificial layer from the front side, but rather from the wafer rear side.

In this case, the chip is sealed in a vacuum-tight manner with a cover and an underside base. The cover should have a certain minimum thickness (e.g. a few hundred micrometers) in order to prevent the cover from flexing under vacuum. On the other hand, however, the cover must also not be too thick, in order to keep down the absorption of IR radiation in the cover.

The membrane has at least one opening (e.g. a slot) allowing gas to be exchanged from the top side to the underside. On one of the two sides (cover wafer or base closure) or on both sides, a getter medium is preferably introduced in order to ensure hermeticity (e.g. vacuum) with long-term stability. It is particularly advantageous if the getter medium is situated only on the base closure, while the cover wafer comprises optical antireflection layer. The simultaneous application of antireflection layers and getter medium on the cover wafer often entails technological problems.

The thermally sensitive individual pixel preferably contains a thermopile structure, but other thermal infrared sensor types such as, for example, pyroelectric sensors or bolometers are also possible.

The size of the pixel or pixels is less than 400 μm, preferably less than 100 μm.

The thermopile pixel described by way of example consists of a silicon chip produced from a wafer. Specific CMOS-compatible methods of microsystems technology lead, after the actual CMOS process, to the production of the sensor elements (pixels) situated for example on a thin dielectric layer, such as silicon dioxide, silicon nitride, silicon carbide or a combination thereof. Driving a pit through the wafer from the rear side gives rise to thin membranes composed of said dielectric layers on the front side. Hot contacts and also the thermoelectric elements are situated on the membranes. Situated between the region of the hot contacts in the central part of the membrane and the silicon sink—that is the edge surrounding the pit—there are thermocouples on beams which are thermally insulated from the central part of the membrane and the silicon sink by slots in the membrane and thus reduce heat transfer from the hot contacts toward the silicon sink.

In order to be able to keep down the production costs, wafer-level packaging is used as an efficient and cost-saving alternative. In this case, the thermopile sensor in the wafer assemblage is closed in a vacuum-tight manner between a cover wafer and an underside base wafer. The cover is provided with a bulge (cavity) near the pixel, wherein an infrared-transmissive antireflection layer is preferably situated on both sides of the cover in order to direct the infrared radiation with maximum transmission onto the sensor element. The antireflection layer on one or both sides of the cover wafer can also have filter properties in order e.g. to block specific wavelength ranges (so-called long-pass or bandpass filter).

The individual pixels consist of membranes, each of which is perforated in order that gas exchange can take place through the slots. Situated below the individual pixels there is a pit, which, driven in on the rear side, extends through the wafer. The membrane that arises as a result is then separated from the silicon sink and is connected thereto merely via thin webs (beams). Said pit ideally has perpendicular walls in order to achieve a high pixel density. It can be produced by deep silicon etching (so-called DRIE process) from the rear side. This is a simple and CMOS-compatible variant in which the front side having the active regions is protected to the greatest possible extent. As a result, complex protection of the front side is not necessary. The perpendicular walls offer a longer path length to the heat sink even in the case of fillings with gases having low thermal conductivity, such as Kr, Ar.

Other ways of production are also possible, of course, for producing said pit.

A layer comprising a plurality of dielectric layers and integrated double polysilicon thermocouples is situated on the membranes.

In a further embodiment, thermocouples composed of materials having a high Seebeck coefficient are situated on the membrane stack. Amorphous silicon layers, silicon-germanium layers, and also specifically implanted layers are possible.

The cover can consist of silicon; other materials such as glass substrates or other organic and inorganic materials having sufficient transparency in the infrared range are also possible in order to satisfy the requirements in respect of the necessary optical properties.

The infrared coating situated on the cover can consist of various materials and also of a material composite that complies with the requirements of the infrared range to be detected.

The base wafer can consist of silicon or other materials, such as glass. Situated on the base wafer in the direction toward the sensor there is ideally a reflective layer that serves to reflect the transmitted infrared radiation back toward the central part of the membrane. Said layer can be applied on the lower base wafer relatively simply prior to assembly with the sensor wafer.

Metals such as aluminum, gold, silver, titanium nitride and other materials are possible. The metal layer can be provided over the whole area or else in a structured fashion (only directly below the membranes).

Before the closure of the sensor chip with the cover wafer and the base wafer, a getter medium is preferably introduced on one side (e.g. the base wafer), which getter medium, by virtue of the slots, can also reach the cavity below the cover wafer and provides for permanent hermeticity. This production is simple and CMOS-noncritical. Furthermore, the getter medium thus has no contact with the filter layers.

BRIEF DESCRIPTION OF THE DRAWING FIGURES

The invention is described in greater detail below on the basis of exemplary embodiments. In the associated drawings:

FIG. 1: shows a schematic illustration of a basic construction of an encapsulated thermopile sensor array according to the invention comprising three individual pixels;

FIG. 2: shows a sectional illustration of a construction variant of an individual sensor;

FIG. 3: shows a plan view of an excerpt from a pixel according to the invention comprising polysilicon conductive tracks laying one above another and separated from one another by perforation slots;

FIG. 4: shows a construction variant of an infrared thermopile sensor according to the invention comprising four pixels and a respective radiation collector on the central part of the membranes;

FIG. 5: shows a view of an infrared thermopile sensor according to the invention in a wafer-level package;

FIG. 6: shows a construction variant of an infrared thermopile sensor according to the invention comprising a getter medium on the base closure;

FIG. 7: shows a vacuum-tight closure of an infrared thermopile sensor wafer according to the invention comprising cover and base closure; and FIG. 8: shows a vacuum-tight closure of an infrared thermopile sensor wafer according to the invention comprising a cover and a cavity in the base closure.

DETAILED DESCRIPTION

FIG. 1 shows the basic construction of a wafer-level package (WLP) according to the invention comprising a cover wafer 1, and comprising hermetically sealed thermopile sensor arrays comprising three individual pixels 14 in a line for receiving infrared radiation from a measurement object, consisting of a CMOS stack 10 comprising a lower insulating layer on a silicon substrate 3, which is arranged on a base wafer 11. Each individual pixel 14 consists of a membrane 12 above a pit 8 in the silicon substrate 3 with "hot" contacts 2, an infrared thermopile structure and beams 4 connecting the membrane 12 to an edge 13 on a silicon sink 9. The membrane 12 consists of a lower insulating layer 10', such as silicon dioxide, silicon nitride, silicon carbide or a combination thereof, and the CMOS stack 10 situated thereabove.

The infrared-sensitive individual pixels 14 can also be configured as bolometers or pyroelectric sensors.

The cover wafer 1 is configured in a caplike fashion with a cavity 20 on the inner side above the CMOS stack 10, which cavity encloses the three individual pixels 14.

The "cold" contacts (not illustrated) belonging to the thermopile structure are likewise situated on the silicon sink 9. Evaluation electronics 13' can be arranged on the edge 13. The membrane 12 and the beams 4 are separated by slots 7 from the edge 13 and the silicon sink 9, respectively. Situated below the membrane 12 there is a pit 8 having perpendicular or almost perpendicular walls, which extends through the entire silicon substrate 3. By virtue of the perpendicular walls of the pit 8, a greater path length for the infrared radiation transmitted through the membrane 12 upon the first impingement is possible compared with a version having oblique walls.

The cover wafer 1 and the base wafer 11 can each consist of silicon, wherein other materials, such as glass or carbon-containing substrates, such as polymeric materials, are also possible. The base 11 can also consist of a metallic material in order to reflect infrared radiation that passes through slots 7 in the CMOS stack 10 back to the central part of the membrane 12.

Situated on the central part of the membrane 12 and on the beams 4 there is an absorbing layer 6, which absorbs infrared radiation from a measurement object in a predefined wavelength range.

In order to produce a hermetic sealing, it is possible to assemble a cover wafer 1 and a base wafer 11, with the sensor wafer, consisting of silicon sink 9 and CMOS structure 10, therebetween. The base wafer 11 has the function of hermetically sealing the pit 8 below the membrane 12.

The hermetic sealing can also arise with the aid of pick-and-place technology, known from construction and connection technology, by applying small caps on the front and rear sides at the chip level.

The base wafer 11 is necessary in order to close the pit 8 or the pits 8 in the case of a plurality of individual pixels 14, e.g. in a line or a matrix structure comprising individual pixels 14. Through the slots 7 in the membrane 12, molecules from the space below the membrane 12 would otherwise pass into the evacuated space above the membrane 12 and the hermetic sealing would be ineffective.

The thermopile sensor array is filled with a gas or gas mixture having a thermal conductivity that is lower than that of air or nitrogen, in order to minimize the convection of sensitive elements on the central part of the membrane 12 and the beams 4 to the silicon sink 9, or the housing, consisting of cover wafer 1 and base wafer 11, which function as a heat sink.

In order to achieve this low thermal conduction of the medium enclosed in the housing, a gas having a greatly reduced internal pressure by comparison with normal air pressure is ideally used (e.g. a gas vacuum).

For ensuring the vacuum, the use of getter media is preferred in order to getter, i.e. to bind, disturbing gaseous elements situated in the package as a result of the production thereof. On account of the perforation of the membrane 12 by the slots 7, only one getter medium is advantageously necessary, which can be situated anywhere in the package. As a result, the costs decrease by comparison with the version without slots 7 in the membrane 12.

FIG. 2 shows a construction variant of a single-element sensor in the wafer assemblage, which sensor corresponds in principle to an individual pixel 14 according to FIG. 1, wherein there is respectively arranged a cover wafer 1 above and a base wafer 11 below the thermopile sensor or the silicon substrate 3 having the thermocouples 3', in order to produce a hermetic sealing of all hollow spaces therebetween. The cover wafer 1 (cap) can be applied to a wafer for example also using a method of construction and connection technology, the pick-and-place method.

One or more thermocouples are situated on the central part of the membrane 12 and the beams 4. Said thermocouples can be produced in a CMOS process, subsequent application also being possible. That may be the case if the thermoelectric materials are not available in the CMOS process.

A reflective layer 17 is preferably situated on the top side of the base wafer 11, that is to say on the side facing the sensor, or the base itself is reflective. Furthermore, a getter medium 18 is situated here for maintaining a vacuum with long-term stability. After the completion of the single-element sensors, the wafer is singulated using customary separating means.

FIG. 3 shows an illustration of an excerpt from a pixel according to the invention comprising slots 7, comprising cold contacts 5 situated on the silicon sink 9. A gas vacuum is situated in the slots 7 in order to prevent heat transfer between the polysilicon conductive tracks 15, 15' (upper and lower thermocouples). The polysilicon conductive tracks 15, 15' are situated in a manner lying one above another on the membrane 12. Situated on the lower polysilicon conductive track 15 having a specific Seebeck coefficient there is an oppositely doped polysilicon conductive track 15' having an opposite Seebeck coefficient.

Suitable materials therefor are polysilicon or else amorphous silicon layers and in principle the materials which have a high thermoelectric figure of merit, with one n-conducting layer and the other p-conducting layer in order to achieve a maximum signal voltage per generated temperature difference in the pixel 14. Per pixel 14, however, a thermocouple can also contain a larger number of series-connected thermocouples.

A portion of the evaluation electronics 13' for the pixels 14 can be arranged around the pixels 14 or outside the cold contacts 5.

FIG. 4 shows a construction variant of a thermopile sensor according to the invention comprising four pixels 14 and radiation collectors 16 in each case on the central part of the membrane 12 for increasing the filling factor. The radiation collectors 16 are situated in the cavity 20 of the cover wafer 1. Since the distance between the radiation collector 16 and the heat sink 9 or the cover 1 can be very small, the vacuum-tight closure of the sensor chip has a particularly advantageous effect. Situated between the pixels there are metal lines and evaluation electronics (power supply, switch, preamplifier, analog-to-digital converter, or parts thereof).

The radiation collector 16 is ideally produced from one or more layers in order to achieve the highest possible absorptance for the incoming IR radiation. The hot contacts 2 are seated in the central part of the membrane 12, or directly in the stamp that carries the radiation collector 16 and connects the latter to the membrane 12. It is thus possible to directly detect the heat flow from the radiation collector 16 to the central part of the membrane 12 without detours.

The pit 8 in the silicon substrate 3, said pit being situated below the central part of the membrane 12, is produced by etching or other methods from the rear side in such a way that the silicon substrate 3 is etched through completely as far as the membrane 12, as far as the dielectric layer below the CMOS stack 10. The process of deep silicon etching (Deep RIE, DRIE) is ideally used for this purpose.

Furthermore, situated in the pit 8 there are a getter medium 18 and a reflective layer 17, which is arranged on the base closure 11 on the side facing the sensor.

Figure 1:
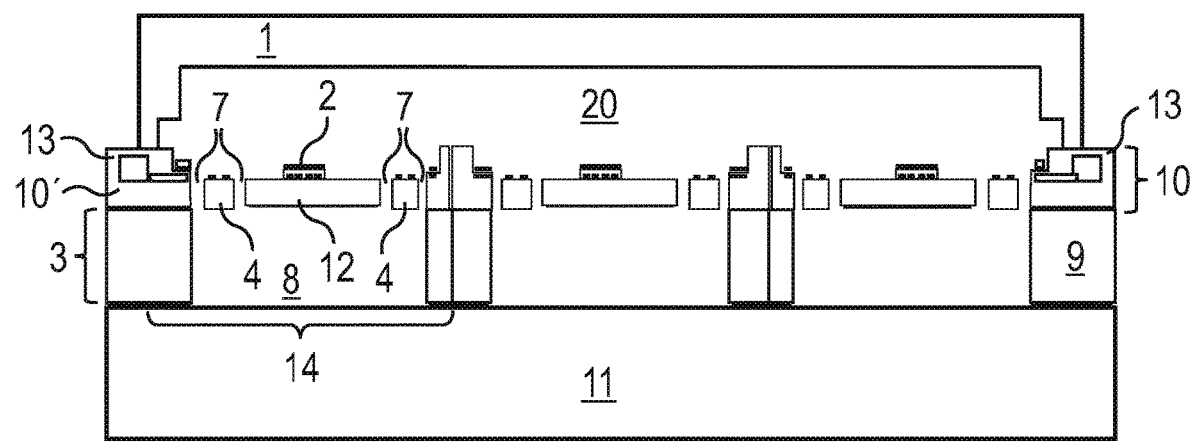
Figure 2:
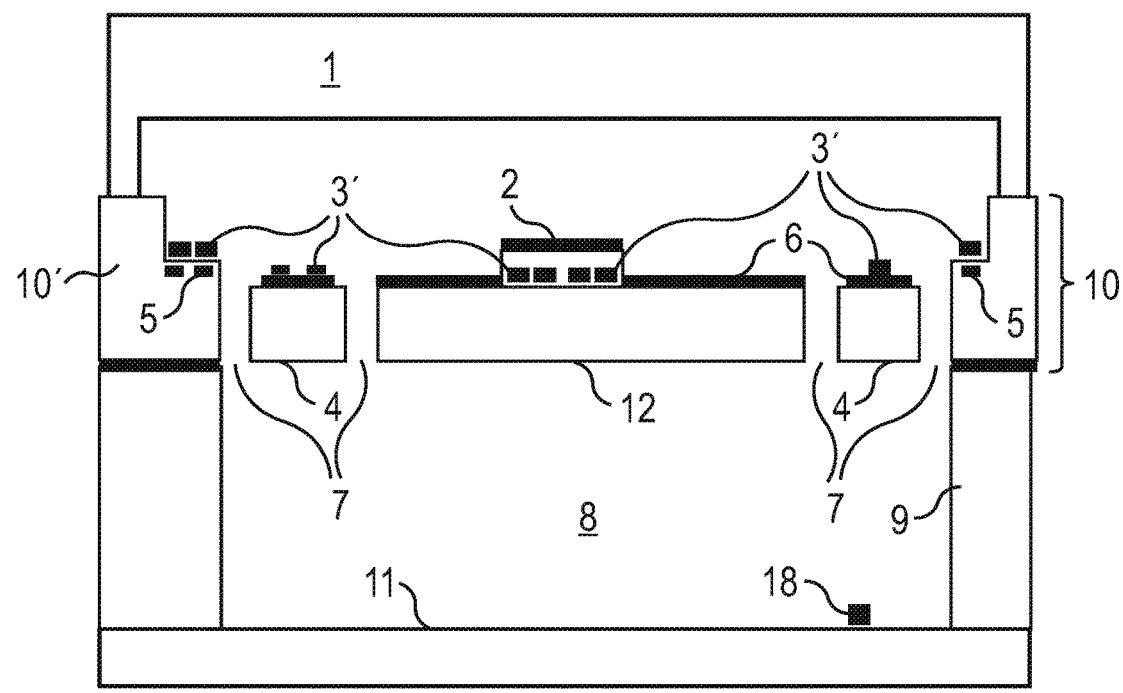
Figure 3:
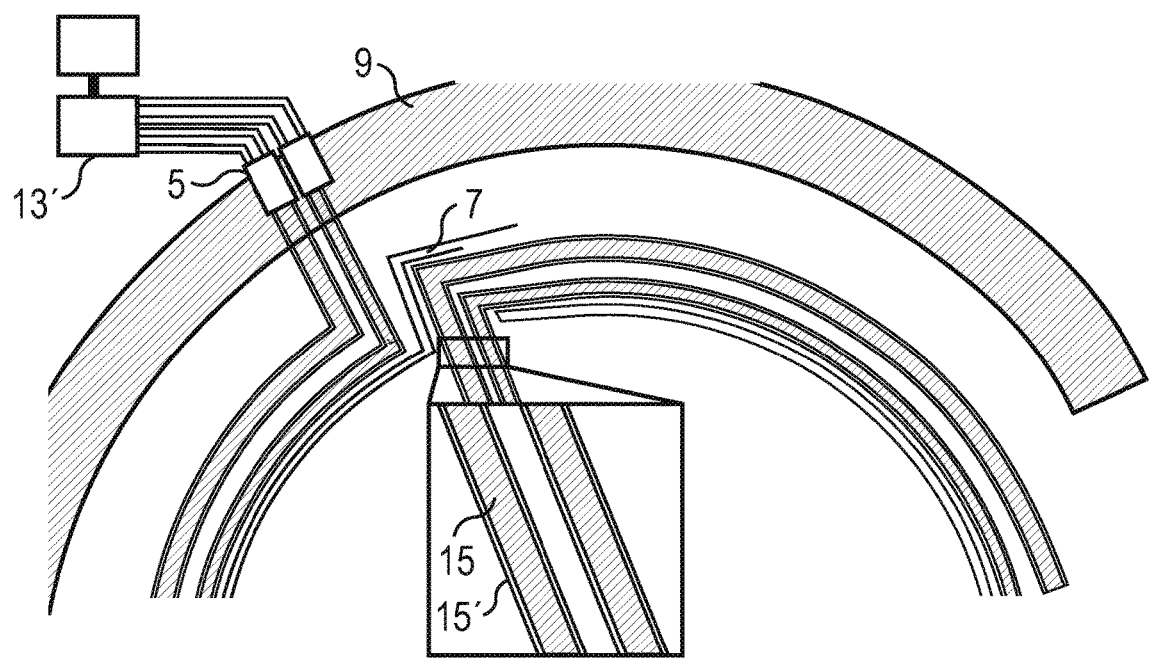
Figure 4:
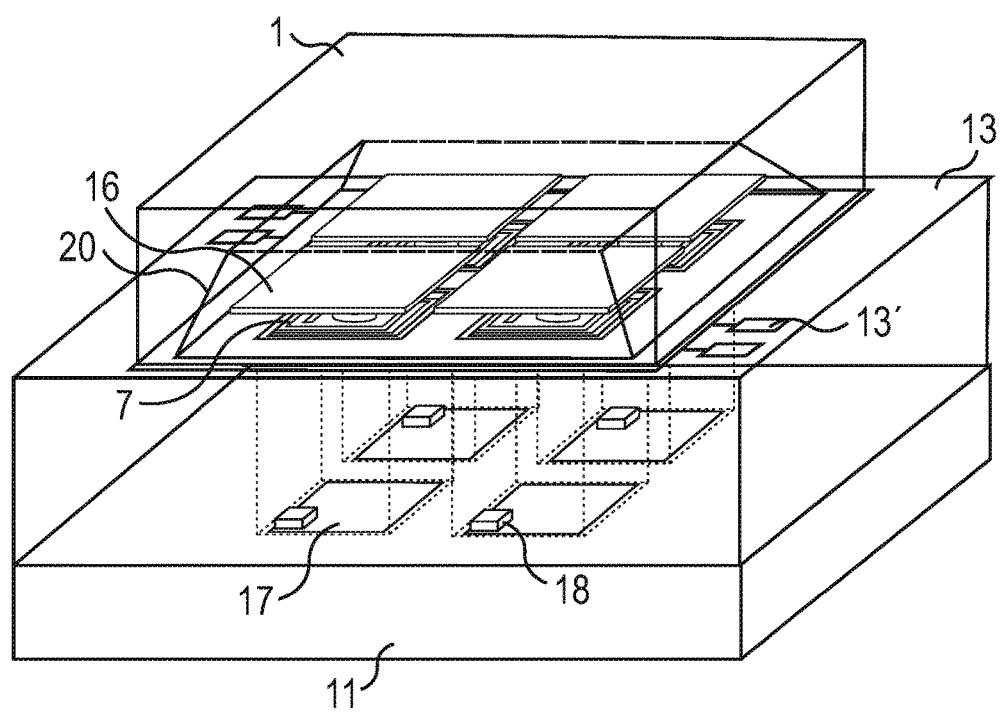
Figure 5:
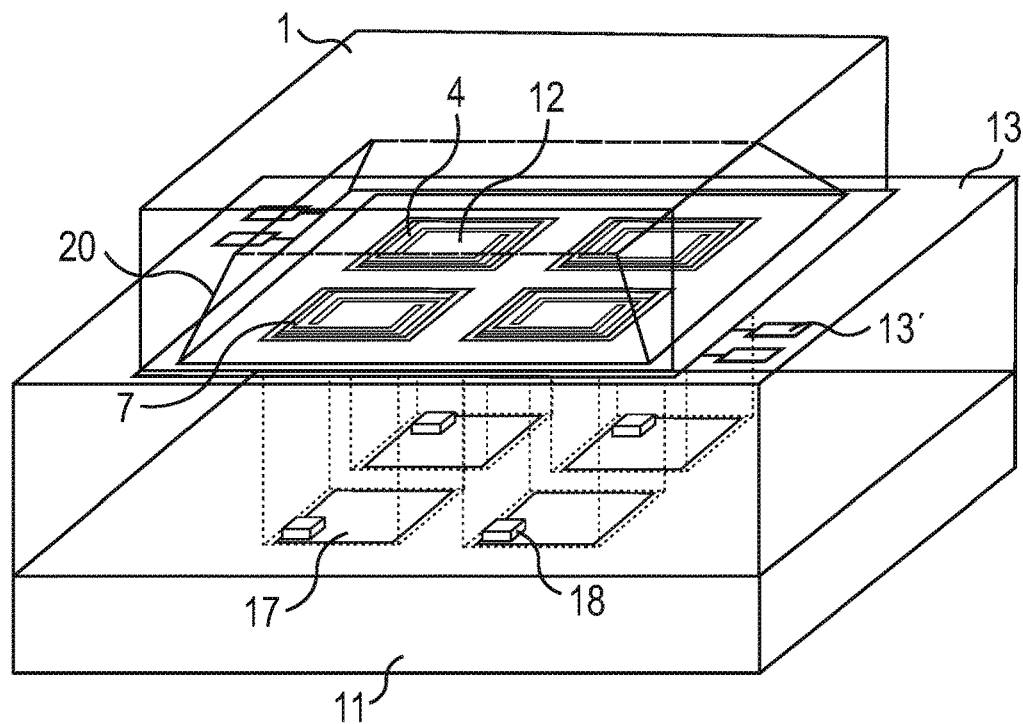
FIG. 5 shows a plan view of a thermopile sensor according to the invention in a wafer-level package.
Figure 6:
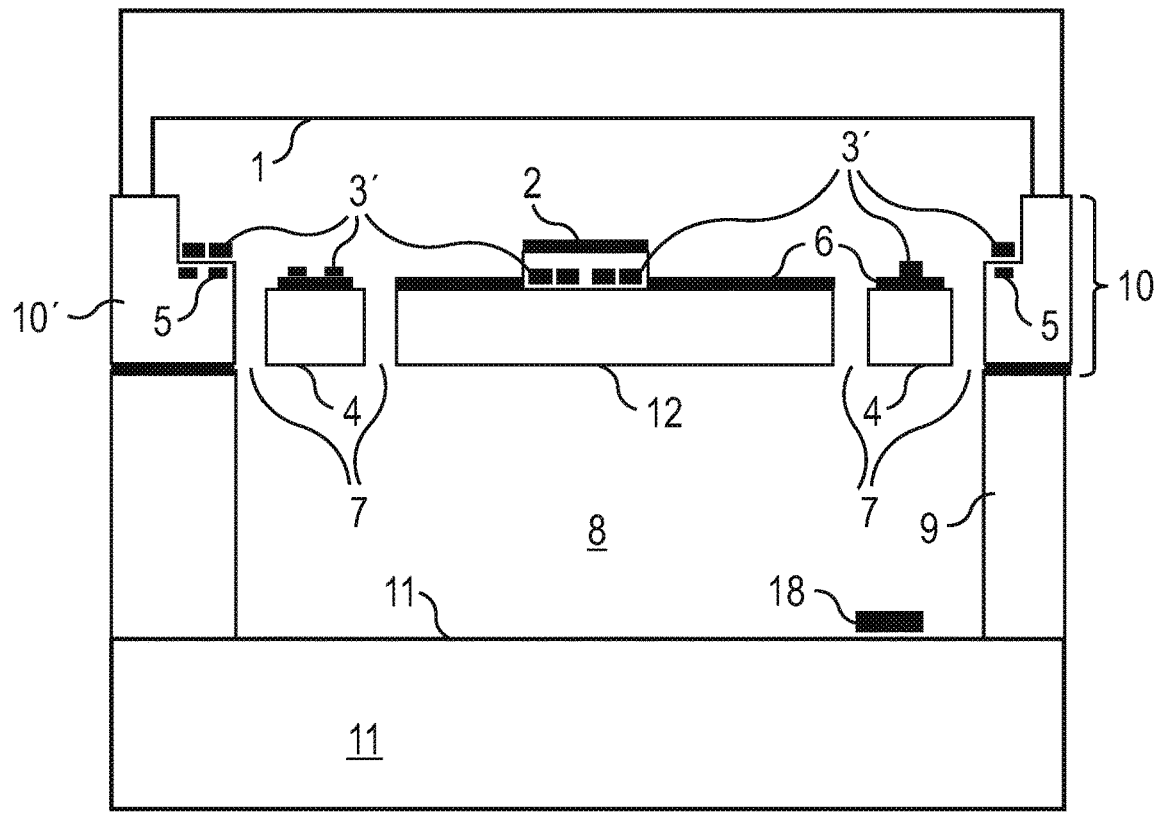
FIG. 6 illustrates a construction variant of a thermopile sensor according to the invention comprising a getter medium 18 on the base closure 11.

The individual pixels 14 consist of membranes 12, each of which is perforated in order that gas exchange can take place through the slots 7. Situated below the individual pixels 14 there is in each case a pit 8, which, driven in from the rear side by deep silicon etching (DRIE process), extends through the wafer (silicon substrate 3). The membrane 12 that arises as a result is then separated from the silicon sink 9. The pit 8 ideally has perpendicular walls in order to achieve a high pixel density.

Preferably, a getter medium 18 known per se is also applied on the base wafer 11, said getter medium ensuring the stability of the vacuum after the closure over a long period of time. The arriving infrared radiation is not disturbed thereby since the getter medium 18 is situated below the pixel. A gas exchange or vacuum in the upper cover 1 as well is ensured through the perforated membrane 12. Depending on the size and type of the getter medium, the latter can be situated, in principle, anywhere in the housed region, e.g. also below the upper cover 1, or alongside the sensor region.

The closure of the cover wafer 1 and of the base wafer 11 having the actual sensor wafer carrying the pixels can be effected by various methods known per se. The latter include anodic bonding, glass frit bonding, or methods such as soldering or welding.

Figure 7:
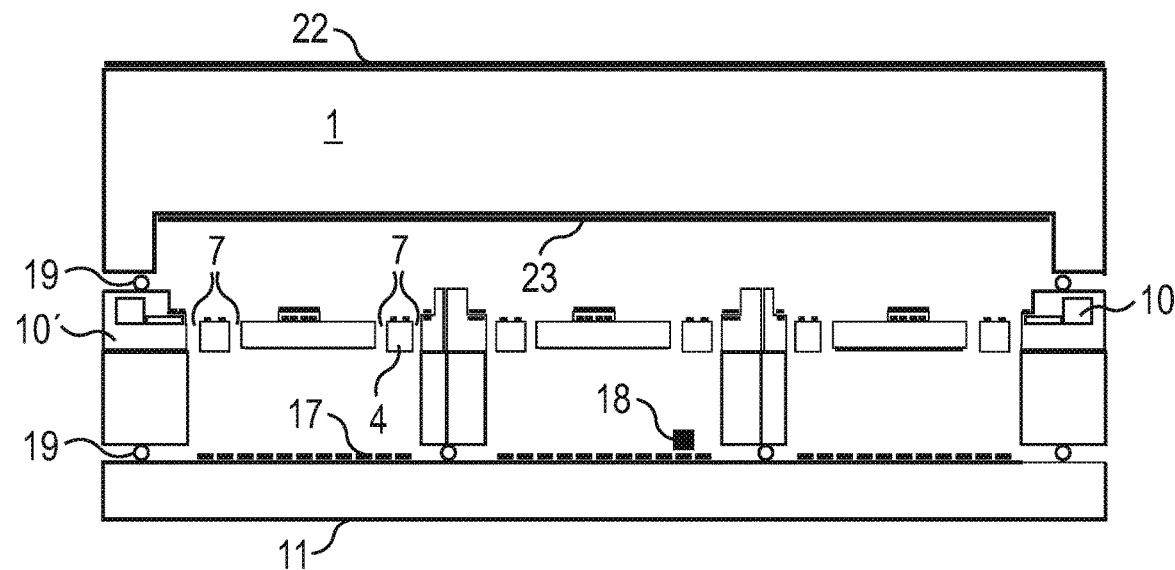

FIG. 7 schematically illustrates a variant of wafer bonding. The three wafers (cover wafer 1, base wafer 11 and sensor wafer), consisting of the silicon substrate 3 with the silicon sinks 9, the membranes 12 and the respective CMOS stack 10 therebetween, are assembled by means of a suitable bond material 19 applied on the wafers, using a wafer bonder. Glass frit, solders and other weldable materials are possible bond materials. Direct (anodic) bonding is also possible, such that the bond material 19 can be obviated in this case.

On the base wafer 11, reflective metal layers 17 are applied on the inner side, which can be carried out e.g. by vapor deposition, chemical vapor deposition (CVD) or sputtering. Said metal layers can be embodied over the whole area and also in structured fashion per pixel 14. Furthermore, an optical filter layer 22 and 23 is situated on the top side and the underside, respectively, of the cover wafer 1. These filter layers 22, 23 serve to improve the optical transmission of the cover wafer 1. These filter layers 22, 23 can either be antireflection layers or have a long-pass or bandpass character and block specific spectral components of the infrared radiation.

In principle, the getter medium 18, the reflection layer 17 and the filter layers 22 and 23 can also be employed in the other solutions according to the invention in accordance with FIGS. 1-6.

In specific cases (e.g. in the case of pixels 14 having a very small center-to-center distance and very thin walls with respect to the neighboring pixel), however, it may be advantageous if, on the base wafer 11, a non-reflective layer is applied which stray radiations which e.g. enter through the slots 7, are not reflected at the base and pass on the return path through the thin silicon wall to the neighboring pixel and thereby impair the image sharpness.

Furthermore, for a single-element sensor or an array having a small number of pixels there is a possibility of introducing in the base wafer 11 toward the sensor a cavity 21 that is at least of the same size as the pits 8 of an individual pixel 14, in which in each case a reflective layer 17 and getter medium 18 are situated. The advantage is that a getter material 18 need not be situated below each pixel 14.

Figure 8:
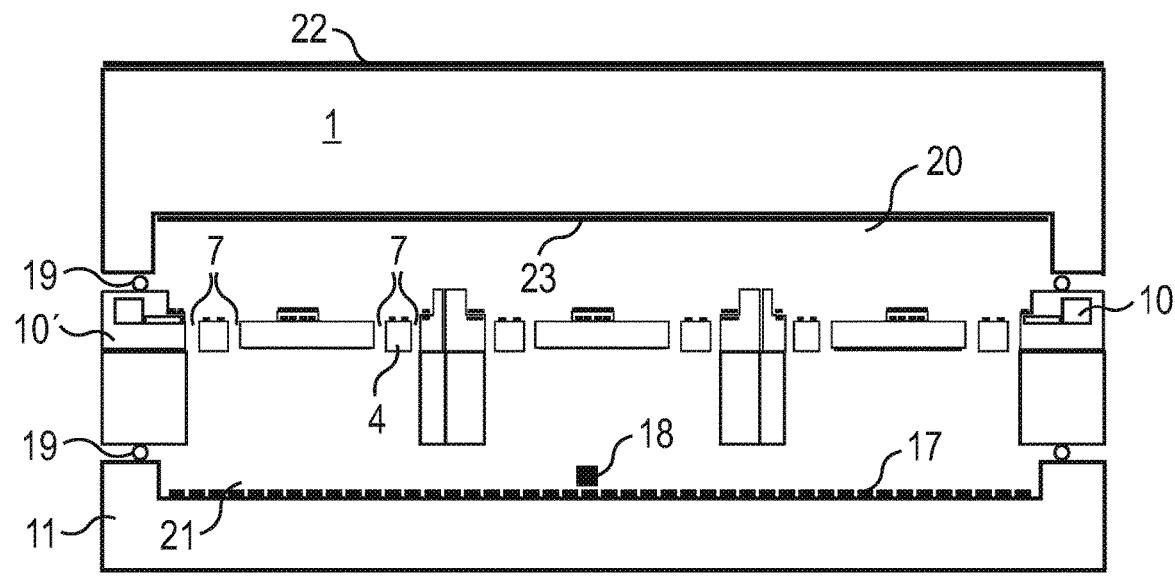

The cavity 21 in the base wafer 11 can also be embodied with a size such that the entire pixel region, the entire array, is underant. In this case, the base wafer 11 having the cavity 21 can correspond to the cover wafer 1 having the cavity 20, and would just need to be mounted in a mirror-inverted manner. Identical component parts can thus be produced and used for the cover wafer 1 and the base wafer 11 (FIG. 8). The reflective layer 17 can extend over the entire cavity 21.

What is crucial is that the getter material 18 introduced can produce a sufficiently high hermeticity. However, this variant is unfavorable for a high-resolution array having pixels>500 since heat that arises at the cold contacts or in the electronics can be dissipated to the surroundings poorly via the silicon sinks 9 between the pixels and the sensitivity can be adversely influenced as a result.

The following variant is also possible, moreover, and not illustrated: Instead of the cover wafer 1, separated caps are individually applied to the sensor regions of each chip. The pick-and-place method is ideally used for this purpose since it is cost-effective. It would be advantageous that the highly accurate alignment of a cover wafer 1 otherwise required would be obviated.

LIST OF REFERENCE SIGNS

1 Cover (wafer)
2 Hot contact
3 Silicon substrate
4 Beam
5 Cold contact
6 Absorbing layer
7 Slot
8 Pit
9 Silicon sink/heat sink
10 CMOS stack
10' Insulating layer
11 Base (wafer)
12 Membrane
13 Edge
13' Evaluation electronics
14 Individual pixel
15 Polyconductive track
15' Polyconductive track
16 Radiation collector
17 Reflective layer
18 Getter medium
19 Bond material
20 Cavity in the cover wafer
21 Cavity in the base wafer
22 Filter layer
23 Filter layer

The invention claimed is:

1. A thermal infrared sensor array in wafer-level package comprising:
   at least one individual infrared-sensitive pixel produced using silicon micromachining, each individual pixel comprising:
      a thermally insulating pit in a silicon substrate;
      a silicon edge as a heat sink, the silicon edge surrounding the insulating pit;

a thin membrane above the insulating pit, the membrane being connected to the silicon edge by thin beams, the beams comprising a thermopile structure, a bolometer, or a pyroelectric sensor;

slots positioned between the membrane and the beams as well as between the beams and the silicon edge;

wherein the insulating pit, etched from a rear side, extends through the entire silicon substrate as far as the membrane and the insulating pit having perpendicular walls;

wherein a plurality of the infrared-sensitive individual pixels are arranged in linear or array form and are configured in a CMOS stack on a dielectric layer, in a manner forming the membrane, and are arranged between at least one cover wafer configured in a cap-like fashion and having a cavity enclosing the plurality of infrared-sensitive individual pixels and a base wafer to hermetically seal, below the membrane, the insulating pit of each individual infrared-sensitive pixel of the plurality of individual pixels, wherein the at least one cover wafer, the silicon substrate and the base wafer are connected to one another in a vacuum-tight fashion, in a manner enclosing a gas vacuum with a reduced internal pressure by comparison with normal air pressure.

2. The thermal infrared sensor array as claimed in claim 1, wherein the at least one cover wafer comprises an infrared-transmissive material of silicon-germanium, zinc sulfide, chalcogenide, barium fluoride or a polymer.

3. The thermal infrared sensor array as claimed in claim 1, wherein the base wafer comprises silicon or a thermally adapted glass, or metallic material.

4. The thermal infrared sensor array as claimed in claim 3, wherein a whole-area or structured reflective layer composed of aluminum, gold, silver or titanium nitride is situated on the base wafer.

5. The thermal infrared sensor array as claimed in claim 1, wherein an absorbing layer, which absorbs infrared radiation in a predefined wavelength range, is situated on a central part of the membrane and on the beams.

6. The thermal infrared sensor array as claimed in claim 1, wherein the at least one cover wafer is provided with an infrared-transmissive antireflection layer or a filter layer on an outer side facing a measurement object and also on an inner side having the cavity.

7. The thermal infrared sensor array as claimed in claim 6, wherein the infrared-transmissive antireflection layer is provided with a long-pass or bandpass coating.

8. The thermal infrared sensor array as claimed in claim 1, wherein a getter medium is applied at least on the at least one cover wafer or on the base wafer.

9. The thermal infrared sensor array as claimed in claim 1, wherein a getter medium is arranged in the pit or pits below the membrane or at least in the cavity in the at least one cover wafer, or in a cavity in the base wafer.

10. The thermal infrared sensor array as claimed in claim 1, wherein the base wafer is coated with an absorbing layer over a large area.

11. The thermal infrared sensor array as claimed in claim 1, wherein the at least one infrared-sensitive individual pixel is configured as a thermopile comprising a thermocouple[s] composed of two semiconducting materials lying one above the other, but oppositely doped, said two semiconducting materials comprising polysilicon, amorphous silicon layers, SiGe, or other thermoelectric materials.

12. The thermal infrared sensor array as claimed in claim 1, wherein each individual pixel has a radiation collector connected to a central part of a respective membrane via a stamp and which is situated in the cavity of the at least one cover wafer.

13. The thermal infrared sensor array as claimed in claim 1, wherein the at least one cover wafer, the silicon substrate and the base wafer are connected to one another by anodic bonding, eutectic bonding, welding bonding, glass frit bonding, or other wafer bonding methods.

14. The thermal infrared sensor array as claimed in claim 1, wherein a cavity is introduced in the base wafer toward the individual pixel, and is of at least the same size as the pit of an individual pixel, or extends over an entire region of individual pixels.

15. A thermal infrared sensor array in wafer-level package comprising at least one infrared-sensitive pixel produced using silicon micromachining, wherein the at least one infrared-sensitive pixel produced using silicon micromachining includes at least one small pixel having a size of d<400 µm, comprising a thermally insulating pit in a silicon substrate, said insulating pit being positioned below a central portion of a membrane and surrounded by a silicon edge as a heat sink, and comprising a thin membrane above the insulating pit connected to the silicon edge by thin beams comprising a thermopile structure, a bolometer, or a pyroelectric sensor, wherein the insulating pit extends from a rear side completely through the silicon substrate as far as the membrane and the insulating pit having perpendicular walls, wherein slots, through which gas exchange occurs, are situated between the membrane, the beams and the silicon edge, the slots being positioned to thermally insulate the beams from the central portion of the membrane and from the silicon sink, wherein a plurality of infrared-sensitive individual pixels are arranged in linear or array form and are configured in a CMOS stack on a dielectric layer, in a manner forming the membrane, and are arranged between at least one cover wafer configured in a cap-like fashion and having a cavity enclosing the plurality of infrared-sensitive individual pixels and a base wafer to hermetically seal, below the membrane, the insulating pit of each individual infrared-sensitive pixel of the plurality of individual pixels, wherein the at least one cover wafer, the silicon substrate and the base wafer are connected to one another in a vacuum-tight fashion, in a manner enclosing a gas vacuum with a reduced internal pressure by comparison with normal air pressure.

* * * * *